(12) United States Patent
Jacobson et al.

(10) Patent No.: US 12,228,548 B2
(45) Date of Patent: Feb. 18, 2025

(54) COATING INSPECTION USING STEADY-STATE EXCITATION

(71) Applicants: Chevron U.S.A. Inc., San Ramon, CA (US); Triad National Security, LLC, Los Alamos, NM (US)

(72) Inventors: Erica Marie Jacobson, Los Alamos, NM (US); Ian Thomas Cummings, Los Alamos, NM (US); Eric Brian Flynn, Santa Fe, NM (US); Adam Joseph Wachtor, Los Alamos, NM (US); Benjamin M Chaloner-Gill, Alameda, CA (US); Brock Genter, San Ramon, CA (US); Martin Quintero, Houston, TX (US); Ryan S. Sanders, Helena, MT (US)

(73) Assignees: Chevron U.S.A. Inc., San Ramon, CA (US); Triad National Security, LLC, Los Alamos, NM (US)

( * ) Notice: Subject to any disclaimer, the term of this patent is extended or adjusted under 35 U.S.C. 154(b) by 353 days.

(21) Appl. No.: 17/693,369

(22) Filed: Mar. 13, 2022

(65) Prior Publication Data
US 2023/0288375 A1 Sep. 14, 2023

(51) Int. Cl.
*G01N 29/07* (2006.01)
*G01N 29/44* (2006.01)

(52) U.S. Cl.
CPC ......... *G01N 29/07* (2013.01); *G01N 29/4427* (2013.01); *G01N 29/4463* (2013.01); *G01N 2291/011* (2013.01); *G01N 2291/0237* (2013.01)

(58) Field of Classification Search
CPC ............ G01N 29/07; G01N 29/4427; G01N 29/4463; G01N 2291/011; G01N 2291/0237
USPC .......................................... 73/597, 598, 587
See application file for complete search history.

(56) References Cited

U.S. PATENT DOCUMENTS

| | | | |
|---|---|---|---|
| 4,567,764 A | * | 2/1986 | Jamison ............... G01N 29/045 73/611 |
| 6,393,384 B1 | | 5/2002 | Anthony |
| 6,487,909 B2 | | 12/2002 | Harrold |
| 9,880,133 B1 | | 1/2018 | Stephanou |
| 10,444,195 B2 | | 10/2019 | Bingham |
| 10,794,836 B1 | | 10/2020 | Flynn |
| 11,022,429 B2 | | 6/2021 | Stull |

(Continued)

FOREIGN PATENT DOCUMENTS

| | | | | |
|---|---|---|---|---|
| GB | 1315704 A | * | 5/1973 | ............ G01V 1/005 |
| WO | WO-2013161835 A1 | * | 10/2013 | ............ G01N 29/07 |

OTHER PUBLICATIONS

Translation for WO 2013/161835 A1 (Year: 2013).*

(Continued)

*Primary Examiner* — John E Breene
*Assistant Examiner* — Rose M Miller
(74) *Attorney, Agent, or Firm* — Esplin & Associates, PC

(57) ABSTRACT

A structure including a substrate and a coating over the substrate is acoustically excited to measure acoustic response in the structure. The measured acoustic response in the structure is filtered to remove acoustic response of the substrate and determine acoustic response of the coating. The acoustic response of the coating is used to inspect the coating for failure.

20 Claims, 8 Drawing Sheets

(56) References Cited

U.S. PATENT DOCUMENTS

| | | | |
|---|---|---|---|
| 2002/0186379 A1 | 12/2002 | Drake |
| 2005/0004457 A1 | 1/2005 | Moilanen |
| 2006/0052979 A1 | 3/2006 | Park |
| 2006/0144147 A1 | 7/2006 | Ishimaru |
| 2008/0006087 A1 | 1/2008 | Winter |
| 2011/0016975 A1 | 1/2011 | Glaesemann |
| 2013/0160552 A1 | 6/2013 | Nakata |
| 2013/0312529 A1 | 11/2013 | Park |
| 2014/0208852 A1 | 7/2014 | Instanes |
| 2015/0049343 A1 | 2/2015 | Shaked |
| 2015/0204822 A1 | 7/2015 | Horan |
| 2015/0300995 A1 | 10/2015 | Flynn |
| 2019/0186898 A1 | 6/2019 | Stull |
| 2019/0331820 A1 | 10/2019 | Goodman |
| 2020/0191754 A1 | 6/2020 | Findikoglu |
| 2021/0041352 A1 | 2/2021 | Flynn |

OTHER PUBLICATIONS

PCT Search Report and Written Opinion for Application No. PCT/US2023/013638.

Alleyne, D. et al. "A two-dimensional Fourier transform method for the measurement of propagating multimode signals". J. Acoust. Soc. Am., vol. 89(3), Mar. 1991, pp. 1159-1168. (Year: 1991).

Flynn, E.B. et al. "High-speed, non-contact, baseline-free imaging of hidden defects using scanning laser measurements of steady-state ultrasonic vibration". Structural Health Monitoring 2013, 2013, pp. 1-8. (Year: 2013).

Kostli, Kornel P. et al. "Two-dimensional photoacoustic imaging by use of Fourier-transform image reconstruction and a detector with an anisotropic response". Applied Optics, vol. 42, No. 10, Apr. 1, 2003, pp. 1899-1908. (Year: 2003).

Moreau, Ludovic. "Monitoring ice thickness and elastic properties from the measurement of leaky guided waves: A laboratory experiment". J. Acoust. Soc. Am., vol. 142(5), Nov. 2017, pp. 2873-2880. (Year: 2017).

PCT Search Report and Written Opinion for Application No. PCT/US21/54012, mailed Feb. 3, 2022 (9 pages).

Schoonover, Robert W. et al. "Numerical investigation of the effects of shear waves in transcranial photoacoustic tomography with a planar geometry". Journal of Biomedical Optics, vol. 17(6), Jun. 2012, pp. 061215-1-061215-11. (Year: 2012).

Stull, et al. On the Theoretical Limitations in Estimating Thickness of a Plate-Like Structure From a Full-Field Single-Tone Response Lamb Wave Measurement, Los Alamos National Laboratory, Sep. 2017 (16 pages).

* cited by examiner 610 620

COATING INSPECTION USING STEADY-STATE EXCITATION

STATEMENT REGARDING FEDERAL RIGHTS

The United States government has certain rights in this invention pursuant to Contract No. 89233218CNA000001 between the United States Department of Energy and TRIAD National Security, LLC for the operation of Los Alamos National Laboratory.

PARTIES TO JOINT RESEARCH AGREEMENT

The research work described here was performed under a Cooperative Research and Development Agreement (CRADA) between Los Alamos National Laboratory (LANL) and Chevron under the LANL-Chevron Alliance, CRADA number LA05c10518.

TECHNICAL FIELD

The present disclosure relates generally to the field of coating inspection.

BACKGROUND

A structure has a coating to protect the underlying structure (substrate). For example, a protective coating is applied to a steel panel to protect the steel panel from damage. Failure in the coating may expose the underlying structure to damage. Identifying failure in the coating enables remedial measures to be taken before the underlying structure is damaged.

SUMMARY

This disclosure relates to coating inspection. Measurement of acoustic excitation in a structure is obtained. The structure includes a substrate and a coating over at least a portion of the substrate. The measurement of acoustic excitation in the structure is filtered to remove acoustic response of the substrate from the measurement. The filtered measurement of acoustic excitation in the structure includes acoustic response of the coating. One or more properties of the coating are determined based on the acoustic response of the coating in the filtered measurement of acoustic excitation in the structure and/or other information.

A system for coating inspection may include one or more electronic storage, one or more processors and/or other components. The electronic storage may store information relating to a structure, information relating to coating on the structure, information relating to acoustic excitation in the structure, information relating to acoustic response of the structure, information relating to acoustic response of the coating, information relating to properties of the coating, and/or other information.

The processor(s) may be configured by machine-readable instructions. Executing the machine-readable instructions may cause the processor(s) to facilitate coating inspection. The machine-readable instructions may include one or more computer program components. The computer program components may include one or more of a measurement component, a filter component, a property component, and/or other computer program components.

The measurement component is configured to obtain measurement of acoustic excitation in a structure. The structure includes a substrate and a coating over at least a portion of the substrate. In some implementations, the measurement of acoustic excitation in the structure may include measurement of displacement response, velocity response, and/or acceleration response.

The filter component is configured to filter the measurement of acoustic excitation in the structure. The measurement of acoustic excitation in the structure is filtered to remove acoustic response of the substrate from the measurement. The filtered measurement of acoustic excitation in the structure includes acoustic response of the coating. In some implementations, filtering the measurement of acoustic excitation in the structure to remove acoustic response of the substrate from the measurement may include applying one or more spatial band-stop filters.

The property component is configured to determining one or more properties of the coating. The propert(ies) of the coating is determined based on the acoustic response of the coating in the filtered measurement of acoustic excitation in the structure and/or other information. In some implementations, the propert(ies) of the coating may include location, size, and/or type of one or more defects in the coating. In some implementations, the defect(s) in the coating may include reduced adhesion between the coating and the substrate.

In some implementations, the propert(ies) of the coating may be determined non-destructively and a distance away from the structure. In some implementations, the propert(ies) of the coating may be determined in a line-of-sight inspection of the structure. In some implementations, one or more maintenance activities for the structure may be performed based on the propert(ies) of the coating.

In some implementations, determining the propert(ies) of the coating based on the acoustic response of the coating in the filtered measurement of acoustic excitation in the structure may include: generating one or more defect maps of the coating based on the acoustic response of the coating in the filtered measurement of acoustic excitation in the structure and/or other information; and determining the propert(ies) of the coating based on the defect map(s). In some implementations, the defect map(s) may be overlaid on top of or registered to the structure.

In some implementations, multiple defects maps of the coating may be generated based on the acoustic response of the coating at different times. Change in or progression of defects in the coating may be determined based on the multiple defect maps overlaid on top of or registered to the structure.

In some implementations, generating the defect map(s) of the coating based on the acoustic response of the coating in the filtered measurement of acoustic excitation in the structure may include determining pixel values of the defect map(s) based on outlier analysis of the acoustic response of the coating and/or other information. In some implementations, the outlier analysis of the acoustic response of the coating may include calculation of changes in the displacement response, the velocity response, and/or the acceleration response.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to coating inspection. A structure including a substrate and a coating over the substrate is acoustically excited to measure acoustic response in the structure. The measured acoustic response in the structure is filtered to remove acoustic response of the substrate and determine acoustic response of the coating. The acoustic response of the coating is used to inspect the coating for failure.

Figure 1:
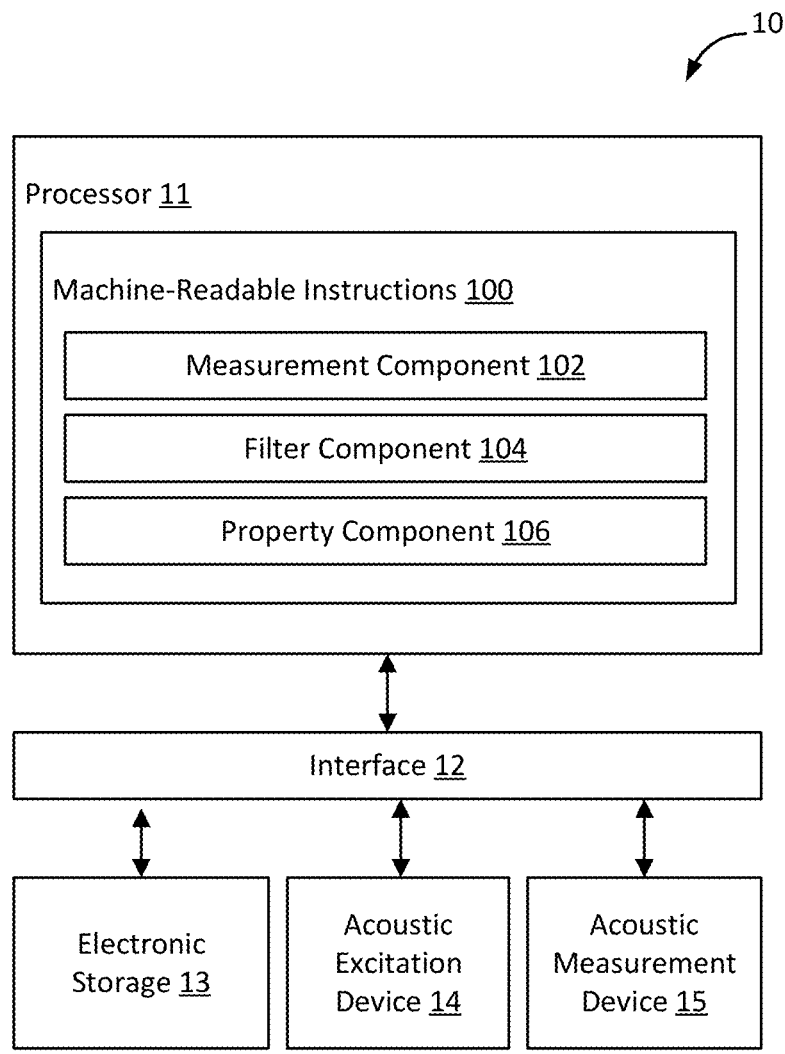
FIG. 1 illustrates an example system for coating inspection.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, an acoustic excitation device 14, an acoustic measurement device 15, and/or other components. Measurement of acoustic excitation in a structure is obtained by the processor 11. The structure includes a substrate and a coating over at least a portion of the substrate. The measurement of acoustic excitation in the structure is filtered by the processor 11 to remove acoustic response of the substrate from the measurement. The filtered measurement of acoustic excitation in the structure includes acoustic response of the coating. One or more properties of the coating are determined by the processor 11 based on the acoustic response of the coating in the filtered measurement of acoustic excitation in the structure and/or other information.

The acoustic excitation device 14 may refer to a device that generates acoustic excitation in a structure. Acoustic excitation of a structure may refer to application of energy to the structure to generate acoustic responses in the structure. An acoustic response may refer to presence of and/or propagation of one or more mechanical waves within the structure. That is, the structure is acoustically excited to produce mechanical wave(s) within the structure. A mechanical wave may include a wave within the audible range and/or a wave above the audible range.

The acoustic excitation device 14 applies energy to the structure to generate acoustic excitation in the structure mechanically (e.g., using one or more transducers, such as a piezoelectric transducer(s)), thermally (e.g., using one or more lasers), and/or by other ways. For example, energy (e.g., in form of sound, heat, ultrasound, vibration) may be applied to the structure through one or more transducers coupled to the structure, one or more pulse lasers, and/or other acoustic excitation devices. For instance, a guided-waves may be generated in a plate-like structure in response to ultrasonic excitation. The ultrasonic excitation/guided waves may be sensitive to different properties of the structures. For example, the ultrasonic excitation/guided waves may be sensitive to defects (e.g., damage) in the coating of the structure, which may change the characteristics of the ultrasonic excitation/guided waves where defects are located in the coating of the structure.

The acoustic excitation device 14 is configured to generate acoustic excitation in the structure. The acoustic excitation device 14 may be configured to generate acoustic excitation in the structure for different purposes. For example, the acoustic excitation device 14 may generate acoustic excitation in the structure using different frequencies to test the acoustic response of the coating of the structure to different frequencies. For instance, the acoustic excitation device 14 may be used to sweep over a range of excitation frequencies, and the measurements of these acoustic excitation in the structure may be used to identify a subset of the tested excitation frequencies for use in more comprehensive coating inspection of the structure The acoustic excitation device 14 may be configured to generate acoustic excitation in the structure using a single excitation frequency at a time or using multiple excitation frequencies at once. For example, the acoustic excitation device 14 may be configured to generate acoustic excitation in the structure using different excitation frequencies. The acoustic excitation device 14 may generate acoustic excitation using a single excitation frequency at a time (start generation of the acoustic excitation in the structure using an excitation frequency, stop generation of the acoustic excitation in the structure using the excitation frequency, start generation of the acoustic excitation in the structure using a different excitation frequency, and so forth). The acoustic excitation device 14 may generate acoustic excitation using multiple excitation frequencies at the same time (e.g., generate acoustic excitation in the structure using all of the excitation frequencies at once, generate acoustic excitation in the structure using two or more of the excitation frequencies at once). In some implementations, the number of excitation frequencies that are used to generate acoustic excitation in the structure may depend on the maximum power output of the acoustic excitation device 14. For example, generating acoustic excitation in the structure using multiple excitation frequencies at once may require the power of the acoustic excitation device 14 to be shared across the multiple excitation frequencies. Generating acoustic excitation in the structure using multiple excitation frequencies at once may require a tradeoff between inspection time and signal level.

The acoustic measurement device 15 may refer to a device that measures acoustic excitation in a structure. Measurement of acoustic excitation in a structure includes the acoustic response to the acoustic excitation in the structure. The acoustic measurement device 15 may refer to a device that measures acoustic responses (e.g., displacement response, velocity response, acceleration response) in the structure. For example, the structure is acoustically excited by the acoustic excitation device 14 to produce mechanical wave(s) within the structure, and the acoustic measurement device 15 measures one or more characteristics of the mechanical wave(s) within the structure, and/or one or more characteristics of the structure that reflects (e.g., indicates, is impacted by) the mechanical wave(s) within the structure.

The acoustic measurement device 15 measures the acoustic excitation in the structure mechanically (e.g., using one or more transducers), optically (e.g., using a scanning laser), and/or by other ways. For example, acoustic excitation in the structure may be measured through one or more transducers coupled to the structure, scanning laser Doppler vibrometer, and/or other acoustic measurement devices. For example, the acoustic measurement device 15 may measure acoustic responses (e.g., full-field surface velocity response) in the structure. An acoustic response may include a vibrational/wave response (e.g., full-wavefield response) in the audible range and/or above the audible range (ultrasonic response).

In some implementations, the acoustic measurement device 15 may include a vibrometer. The vibrometer may include one or more vibrographs and/or other devices that measure the amplitude, velocity, and/or frequency of vibrations in a structure. In some implementations, the vibrometer may measure acoustic responses using one or more beams. For example, the vibrometer may include one or more laser Doppler vibrometers that uses a laser beam to measure acoustic responses in different portions of the structures. The acoustic responses may include the vibration/wave amplitude, velocity, and/or frequency within the structure. A scan path may refer to a path traced and/or followed by the beam(s) of the vibrometer along the structure to make the measurements. In some implementations, the vibrometer may use a raster scan to make the measurements.

The acoustic measurement device 15 is configured to measure acoustic excitation in the structure. The acoustic measurement device 15 may be configured to measure acoustic excitation in the structure for different purposes. For example, the acoustic measurement device 15 may measure acoustic excitation that was generated in the structure to test the acoustic response of the coating of the structure to different frequencies. The acoustic measurement device 15 may measure acoustic excitation that was generated in the structure for more comprehensive coating inspection of the structure. The acoustic measurement device 15 may be configured to measure the acoustic excitations in the structure for different purposes in the same way or in different ways. For example, the acoustic measurement device 15 may make partial measurements of the acoustic excitation in the structure for testing different frequencies and may make full measurements of the acoustic excitation in the structure for the more comprehensive coating inspection. Partial measurement of acoustic excitations in the structure may include incomplete measurement of acoustic excitations in the structure, while full measurement of acoustic excitations in the structure may include complete measurement of acoustic excitations in the structure. For example, partial measurement of acoustic excitations in the structure may include measurement at smaller number of points and/or smaller area than full measurement of acoustic excitations in the structure. Partial measurement of acoustic excitations in the structure may include sampling of particular portions of the structure, with the goal of determining how much (e.g., how efficiently) the different portions of the structure have been acoustically excited using different excitation frequencies. Full measurement of acoustic excitations in the structure may include measurement across the structure, with the goal of inspecting properties of the coating of the structure using the measured acoustic excitations (with the acoustic excitations performed using the selected excitation frequencies).

In some implementations, one or more components of the system 10 may be separate from the system 10. For example, the acoustic excitation device 14 and/or the acoustic measurement device 15 may be separate from the system 10 and may be controlled by one or more processors separate from the processor 11. While the components of the system 10 are shown as single components, this is merely as an example and is not meant to be limiting.

A structure may refer to arrangement and/or organization of one or more things. Thing(s) may be arranged and/or organized into a structure to perform one or more functions. A structure may be composed of a particular type of matter or a combination of different types of matter. For example, a structure may include a metallic, rigid structure and/or other structure. A structure may have a symmetrical shape or an asymmetrical shape. A structure may include one or more simple geometric shapes, one or more arbitrarily complex geometric shapes, and/or other geometric shapes.

In some implementations, a structure may include a hollow structure, a support structure, a moving structure, and/or other structure. A hollow structure may refer to a structure that includes one or more empty spaces within the structure. The empty space(s) may be used to hold, carry, transport, and/or otherwise interact with one or more things. For example, a hollow structure may include a vehicle, a container, a pipe, a pressure vessel, a tank, and/or other hollow structure. A support structure may refer to a structure that provides support for one or more things. For example, a support structure may include an installation, a platform, a frame, a crane, a beam, and/or other support structure. A moving structure may refer to a structure that moves to perform its function. For example, a moving structure may include a turbine blade and/or other moving structure. Non-limiting examples of structures include one or more parts or entirety of offshore floating production installations (such as spars, semisubmersibles, tension leg platforms), oil rigs, ship/barge hulls, offshore mobile drilling units, aircrafts, space launch vehicles, wind turbine blades, pressure vessels, piping systems, ballast tanks, void tanks, and cargo tanks. Other types of structures are contemplated.

In some implementations, a structure may refer to a portion of a larger structure. For example, a structure may refer to a region of interest of a larger structure. That is, rather than inspecting the coating of the entire structure, a particular portion of the coating of the structure may be inspected. As another example, a structure may refer to a component of a larger structure. The coating on the component/part of the component may be inspected.

A coating may refer to one or more materials that cover the surface of a structure. A coating may refer to one or more materials that are applied to the surface of a structure. A substrate may refer to material(s) of the structure on which a coating may be applied. A coating for a structure may cover all of the substrate or parts of the substrate. The structure may be coated using one or more applications of the coating. A coating over the structure may include a single coat of material(s) or multiple coats of material(s). Inner and/or outer surfaces of the structure may be covered with one or more coatings. For example, a coating for a steel panel may cover an outer surface of the steel panel. A coating for a pipe (e.g., liner) may cover inner diameter of the pipe. A hollow structure, such as a tank, may have a coating on both an inner surface and an outer surface, or a coating on either the inner surface or the outer surface. The coating for the inner surface may be the same as or different from the coating for the outer surface. Same or different types of coating may be applied to different parts the structure. Other types of coating are contemplated.

A coating may be applied to a structure to protect the structure and/or to protect materials that come in contact with the structure. For example, a coating may be applied to a storage structure (e.g., container) to protect the structure against accelerated degradation due to either the storage material contents and/or external environment. If the coating becomes compromised, the structure may no longer be protected, and the structure's integrity may degrade. This may pose safety risks and capital setbacks. For example, coating failure may expose the underlying structure (substrate) to potentially harsh conditions, which may result in substantial damage (e.g., corrosion) to the structure. Repairing damaged structure may be much more expensive and time-consuming than repairing the coating. It is crucial to perform regular inspections of coated structures to identify and repair damaged coating, and to maintain coating integrity, before evidence of structural damage appears.

Traditional coating inspection includes manual testing by a technician. The technician may use visual inspection to identify regions in which there are visual indications of damage, and then remove sections of the coating. The technician may send electrical currents through the coating to determine coating thickness and identify regions where the coating is thinning. These inspection methods are time-consuming, may be destructive to the coating, are susceptible to subjectivity of the technician. Additionally, these inspection methods do not predict regions of imminent failure. Furthermore, use of these methods may require the technician to be in undesirable environments, including enclosed spaces (e.g., inside hollow spaces such as a tank or a vessel) and around potentially hazardous materials (e.g., open water, gas, oil). Even for inspection of exterior surfaces, use of these methods may require the technician to be in hazardous locations and/or locations with limited ingress and egress.

The present disclosure utilizes measurement of acoustic excitation in a structure with a coating to determine propert(ies) of the coating, such as the location, size, and/or type of defects in the coating. The acoustic response of the structure is removed from the measurement of acoustic excitation in the structure to obtain acoustic response of the coating, and the acoustic response of the coating is used to determine the propert(ies) of the coating.

In some implementations, the acoustic excitation in the structure with the coating may be measured to obtain temporal surface velocity response. A complex surface velocity response may be computed at the steady-state excitation frequency. Rather than using estimates of local wavenumber from the complex velocity response, the present disclosure utilizes relative velocity calculations to identify indications of defects in the coating. Use of the velocity response in the present disclosure may include use of velocity measurements and/or other temporal characteristics of the response. For example, use of the velocity response may include calculation/derivation of displacement, acceleration, and/or other temporal derivatives from the velocity response, and the displacement, the acceleration, and/or other temporal derivatives may be used in the analysis described herein (e.g., outlier analysis). For instance, displacement and acceleration may be derived from velocity response maps and may be phase-shifts of the velocity response map up to a constant multiplier. In some implementations, displacement, acceleration, and/or other temporal characteristics of the response may be measured without the use of the velocity response.

For example, the structure may be acoustically excited at a frequency (e.g., high-frequency at which coating defects respond, such as greater than 300 kHz) and a coarse-resolution scan of the structure may be performed to identify potentially problematic regions. Fine-resolution scan of these regions may be performed to obtain complex velocity surface response in these regions. The response may be filtered (e.g., using series of band stop filters) to remove the main structural modes, and the filtered response (containing response of the coating/defect in the coating) may be used to determine the propert(ies) of the coating. Poorly adhered coating may respond to these high frequencies, creating regions of high response data that indicate coating defect (e.g., bubbling, blistering, adhesion failure). Outlier analysis may be performed on the response data to identify regions of defects. For example, high-response pixels may indicate presence of coating defect.

The present disclosure enables faster and more efficient nondestructive inspection of structure coatings. The present disclosure may enable remote inspection of coating without the need for the technicians to be present at the location of the coating.

Referring back to FIG. 1, the electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to a structure, information relating to coating on the structure, information relating to acoustic excitation in the structure, information relating to acoustic response of the structure, information relating to acoustic response of the coating, information relating to properties of the coating, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate coating inspection. The machine-readable instructions 100 may include one or more computer program components. The machine-readable instructions 100 may include one or more of a measurement component 102, a filter component 104, a property component 106, and/or other computer program components.

The measurement component 102 is configured to obtaining measurement of acoustic excitation in a structure. The structure includes a substrate and a coating over at least a portion of the substrate. The surface of the structure may be fully or partially covered with a coating. Obtaining measurement of acoustic excitation in the structure may include one or more of accessing, acquiring, analyzing, determining, examining, identifying, generating, loading, locating, making, opening, receiving, retrieving, reviewing, selecting, storing, taking, and/or otherwise obtaining the measurement of acoustic excitation in the structure. The measurement of acoustic excitation in the structure is obtained using the acoustic measurement device 15 and/or other acoustic measurement device(s). The measurement of acoustic excitation in the structure is obtained from the acoustic measurement device 15, other acoustic measurement device(s), and/or other location. For example, the acoustic measurement device 15 may generate information that characterizes, defines, identifies, and/or reflects the measured acoustic excitation in the structure, and the information may be obtained directly from the acoustic measurement device 15 and/or indirectly from the acoustic measurement device 15 (e.g., from electronic storage of the acoustic measurement device 15).

In some implementations, scanning parameters of the acoustic measurement device 15 may be set/adjusted for different types of coating inspection. For example, a tradeoff may exist between resolution and time of scanning. Fine resolution inspections (fine pixel pitch, slow scan speed) may take significantly longer to complete than coarse resolution inspections. Lower scan speeds may increase the signal-to-noise ratio in the measurement.

In some implementations, the measurement of acoustic excitation in the structure may include measurement of displacement response, velocity response, and/or acceleration response in the structure. The measurement component 102 may obtain measurement of displacement response, velocity response, and/or acceleration response in the structure due to the acoustic excitation. In some implementations, the measurements of displacement response, velocity response, and/or acceleration response in the structure may be obtained as a raw wavefield image, with the magnitudes of the raw wavefield image reflecting the types and/or amounts of the displacement response, the velocity response, and/or the acceleration response. In some implementations, a continuous area measurement of acoustic excitation/response in the structure may be obtained. Other measurements of the acoustic excitation in the structure are contemplated.

In some implementations, the measurement of acoustic excitation in the structure may include partial measurement of acoustic excitation in the structure. Partial measurement of acoustic excitation in the structure may include less comprehensive measurement than full measurement. Partial measurement of acoustic excitation in the structure may include incomplete measurement of acoustic excitation in the structure. Partial measurement of acoustic excitation in the structure may include measurement at smaller number of points and/or smaller area of the structure/coating than full measurement of acoustic excitation in the structure. Partial measurement of acoustic excitation in the structure may include sampling of particular portions of the structure/coating, with the goal of determining how much (e.g., how efficiently) the different portions of the structure/coating have been acoustically excited using different excitation frequencies.

Different excitation frequencies may be tested to determine which frequenc(ies) will be used to perform full measurement of acoustic excitation in the structure. In some implementations, the excitation frequenc(ies) selected to perform coating inspection of the structure may depend on the type, composition, and/or thickness of the structure, the type, composition, and/or thickness of the coating, the type of defects to be identified, and/or other information. For example, frequencies between 400 kHz and 600 kHz may prompt stronger excitation in the coating of a metallic structure to reveal defects in the coating. Use of other frequencies are contemplated.

In some implementations, the measurement of the acoustic excitation in the structure may include full measurement of the acoustic excitation in the structure. Full measurement of the acoustic excitation in the structure may include more comprehensive measurement than partial measurement. Full measurement of acoustic excitation in the structure may include complete measurement of the acoustic excitation in the structure. Full measurement of acoustic excitation in the structure may include measurement at larger number of points and/or larger area of the structure/coating than partial measurement of acoustic excitation in the structure. Full measurement of the acoustic excitation in the structure may include sampling of different portions of the structure/coating, with the goal of determining one or more properties of the coating. For instance, acoustic excitation across the entirety of the structure may be measured to produce a full wavefield measurement that shows the acoustic response of the entire coating/region of interest. The full wavefield measurement may be used to identify (e.g., visualize) defects in the coating/region of interest.

The acoustic excitation may be generated in the structure using a single excitation frequency at a time or using multiple excitation frequencies at once. The acoustic excitation in the structure may include a steady-state acoustic excitation (acoustic steady-state wavefield excitation) in the structure. The acoustic excitation in the structure may include a near steady-state acoustic excitation in the structure. A steady-state/near steady-state acoustic excitation may be generated in the structure to inspect the coating of the structure using the steady-state/near steady-state response of the coating to one or more excitation frequencies. For example, measurement of acoustic steady-state wavefield excitation in the structure may be obtained. The excitation frequencies may include one or more ultrasonic frequencies and/or one or more non-ultrasonic frequencies. For example, acoustic excitation device(s) may be used to create a steady-state, multi-tone, ultrasonic excitation of the structure and ultrasonic responses in different portions of the structure may be measured and used to determine properties of coating of the structure at corresponding portions. Use of the steady-state, multi-tone, ultrasonic excitation may enable ultrasonic response measurement to be performed quickly (e.g., scanning areas of a square-meter or more in seconds), without need for repetition, and from a large distance (e.g., tens of meters away). Other types of acoustic excitation of the structure are contemplated.

In some implementations, a complex response (e.g., a complex velocity response) in the structure at the excitation frequency may be obtained from the measurement of the acoustic excitation in the structure. Individual pixels of measurement may contain a segment of temporal response data. The temporal response of the pixels may be transformed into the frequency domain via dot product with a complex exponential at the excitation frequency. For example, the complex-value amplitude and phase response at the excitation frequency may be computing using the following, where v(x,y,t) is the temporal response at pixel location (x,y), $f_0$ is the excitation frequency, and T is the time-length of sliding window (scanning time divided by number of pixels):

$$V(x, y) = \frac{1}{T}\sum_{t=0}^{T} v(x, y, t)e^{-j2\pi f_0 t}$$

A complex-valued wavefield map of the structure/coating's steady-state response may be obtained from the above.

In some implementations, the measurement of the acoustic excitation in the structure may be adjusted based on the geometry of the structure. For example, for a structure with a non-uniform or complex geometrical features, a ranging device (e.g., LiDAR, laser rangefinder) may be used to take distance measurements and generate a point cloud representation of the structure. The point cloud representation of the structure may be used to correct the measurement of the acoustic excitation for geometric distortions. For example, the measurement of the acoustic excitation in the structure may be modified to compensate for acoustic response measurement using beams that are not perpendicular to the portion being scanned. That is, perspective correction may correct for beam angle of incidence that deviates from a line perpendicular to the portion of the structure. For instance, the orientation of individual (planar) sections relative to the scanning system may be determined/estimated using a least squares approach, and the relative perspective of the individual sections may be corrected using the orientations so that acoustic response of the individual sections approximates the acoustic response that would have been measured at normal incidence. Use of other geometric corrections is contemplated.

The filter component 104 is configured to filter the measurement of acoustic excitation in the structure. For example, the measurement of acoustic steady-state wavefield excitation in the structure may be filtered. Filtering the measurement of acoustic excitation in the structure may include use of one or more filters to remove one or more parts of data from the measurement. The measurement of acoustic excitation in the structure includes (1) acoustic response of the substrate, and (2) acoustic response of the coating. For example, ultrasonic complex response (e.g., ultrasonic complex velocity response) of structure may include response modes from the substrate and the coating on the substrate. The structural response may overpower the subtle coating/coating defect response. The measurement of acoustic excitation in the structure is filtered to remove acoustic response of the substrate from the measurement. The dominant structural response (dominant modes) may be identified and removed from the measurement of acoustic excitation in the structure. The filtered measurement of acoustic excitation in the structure includes acoustic response of the coating. For example, the filtered measurement of acoustic excitation in the structure may include acoustic spatial wavefield response of the coating.

Figure 3:
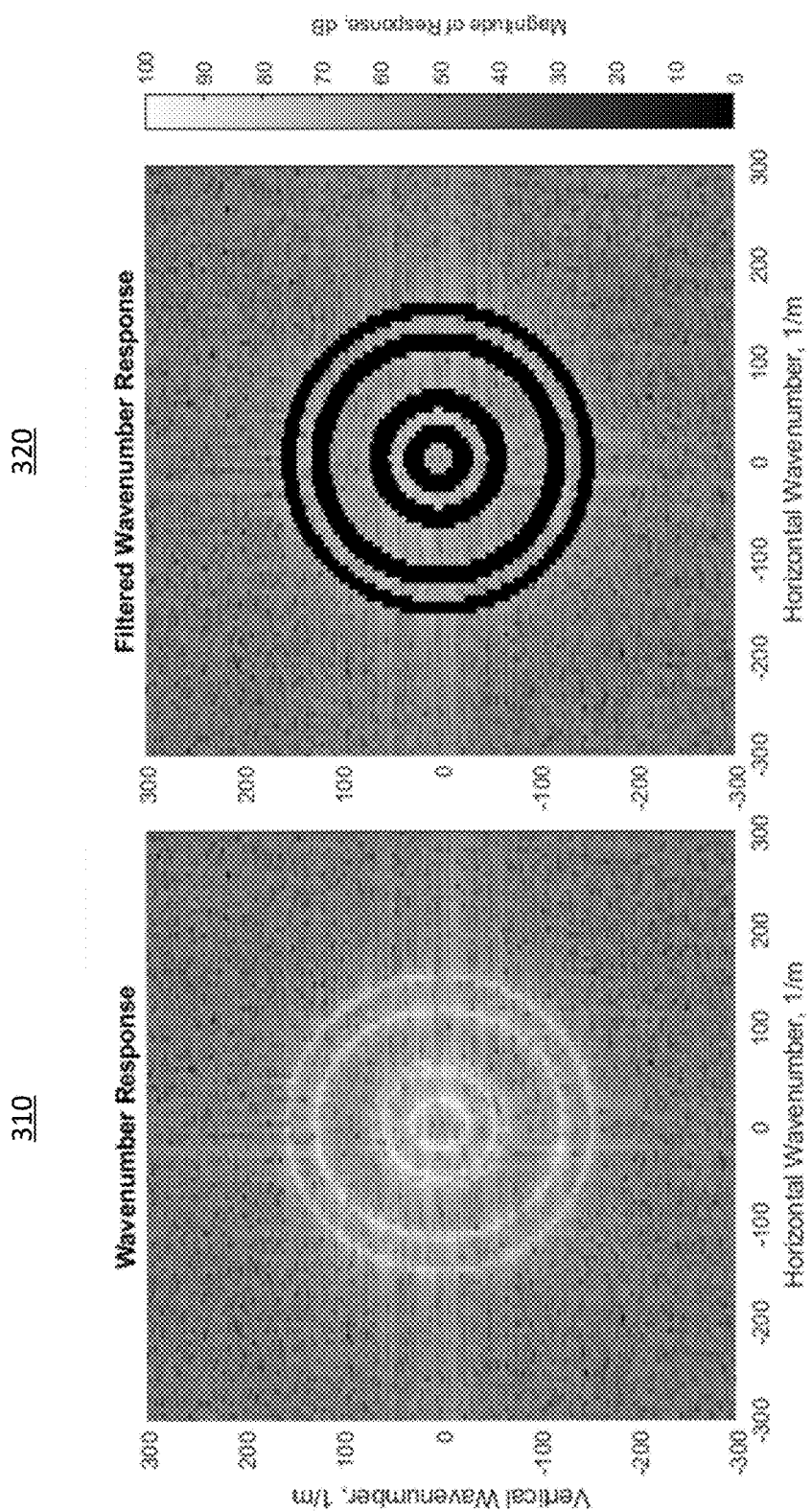
FIG. 3 illustrates an example measurement of acoustic excitation in a structure and an example filtered measurement of acoustic excitation in the structure.

FIG. 3 illustrates an example measurement 310 of acoustic excitation in a structure and an example filtered measurement 320 of acoustic excitation in the structure. The measurement 310 shows wavenumber response in the structure, with the response including both the response from the substrate of the structure and the response from the coating of the structure. The filtered measurement 320 shows filtered wavenumber response in the structure. The filtered measurement 320 is generated by removing the response from the substrate of the structure from the measurement 310. The filtered measurement 320 includes the response from the coating of the structure, and not the response from the substrate of the structure.

Figure 4:
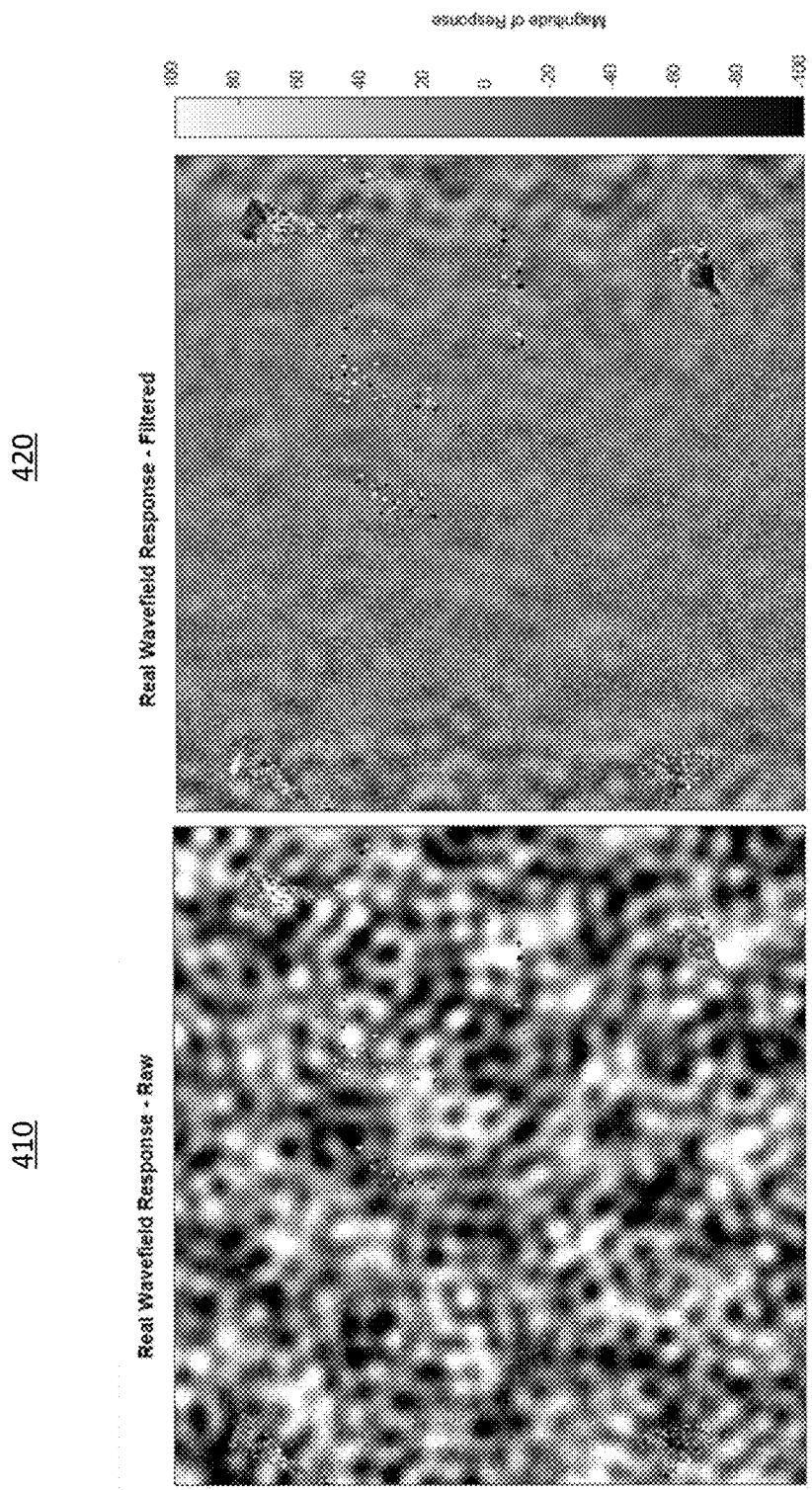
FIG. 4 illustrates an example measurement of acoustic excitation in a structure and an example filtered measurement of acoustic excitation in the structure.

FIG. 4 illustrates an example measurement 410 of acoustic excitation in a structure and an example filtered measurement 420 of acoustic excitation in the structure. The measurement 410 shows real wavefield response in the structure, with the response including both the response from the substrate of the structure and the response from the coating of the structure. The filtered measurement 420 shows filtered real wavefield response in the structure. The filtered measurement 420 is generate by removing the response from the substrate of the structure from the measurement 410. The filtered measurement 420 includes the response from the coating of the structure, and not the response from the substrate of the structure. The coating of the structure may include blisters, which may become more apparent in the filtered measurement 420 after the dominant structural response modes are filtered out.

In some implementations, filtering the measurement of acoustic excitation in the structure to remove acoustic response of the substrate from the measurement may include applying one or more spatial band-stop filters. For example, a series of spatial band-stop filters may be applied to remove acoustic response of the substrate from the measurement. The spatial band-stop filter(s) may be applied in a wavenumber domain and/or a time domain. Use of other types of filters is contemplated.

The property component 106 is configured to determining one or more properties of the coating. A property of a coating may refer to a physical attribute, quality, and/or characteristic of the coating. A property of a coating may include a property of the coating itself and/or a property of an interface/interaction between the coating and the substrate. A property of a coating may refer to a physical attribute, quality, and/or characteristic of a defect in the coating. For example, a property of a coating may include location, size, and/or type of one or more defects in the coating. A defect in the coating may refer to an imperfection or an abnormality in the coating. A defect in the coating may impair the quality, function, and/or utility of the coating. For example, a defect in the coating may include reduced adhesion between the coating and the substrate. Reduced adhesion between the coating and the substrate may include weakening and/or failure of adhesion between the coating and the substrate. Other examples of defects include coating blistering, corrosion creep, and corrosion bleed through. Other types defects are contemplated.

Determination of a property of a coating may include identification of the property, quantification of the property, and/or other determination of the property of the coating. For example, the property component 106 may determine the existence and/or absence of one or more defects in the coating, may identify the type of defect(s) in the coating, may identify the location of defect(s) in the coating, may determine the size of defect(s) in the coating, may determine the shape of the defect(s), may quantify (e.g., provide numbers that define) the defect(s) in the coating, and/or provide other determination of the property of the coating.

The propert(ies) of the coating is determined by the property component 106 based on the acoustic response of the coating (e.g., acoustic spatial wavefield response of the coating) in the filtered measurement of acoustic excitation in the structure and/or other information. The acoustic response of the coating to the excitation frequenc(ies) is used to determine the propert(ies) of the coating. For example, the property component 106 may use the amount and/or type of acoustic excitation in different parts of the coating to determine the propert(ies) of the different parts of the coating.

Such determination of the propert(ies) of the coating may enable non-destructive evaluation of the coating. Such determination of the propert(ies) of the coating may enable the coating to be evaluated from a distance away from the structure. The acoustic excitation in the structure may be measured at a distance away (e.g., 10 meters away) from the structure. For example, the propert(ies) of the coating may be determined as disclosed herein in a line-of-sight inspection of the structure. A line of sight inspection of the structure may include an inspection of the structure that uses an unobstructed view of the structure. Rather than needing to be close and next to the structure for inspection, the line-of-sight inspection may use measurement of the acoustic excitation in the structure from a distance (e.g., from a single distance away from the structure, from different distances away from the structure) to determine the propert(ies) of the coating.

Such inspection may be less intrusive and/or less costly than physical inspection of the structure. For example, to inspect the coating of a high structure, a scaffolding may need to be raised to allow an inspector to reach the coating. The line-of-sight inspection may allow the coating to be inspected without the need of such equipment. As another example, physical inspection of the structure may require physical samples to be taken from the structure/coating, which may require the inspector to visit the structure. Equipment for the line-of-sight inspection (e.g., acoustic excitation device, acoustic measurement device, processor(s)) may be setup at the location of the structure and used without the presence of the inspector. The coating of the structure may be inspected remotely.

In some implementations, one or more maintenance activities for the structure may be performed based on the propert(ies) of the coating. A maintenance activity may refer to an activity to repair a structure/coating. For example, a maintenance activity may be performed to repair defects in the coating. The propert(ies) of the coating as determined herein may be used to determine where to direct maintenance work for the structure. The propert(ies) of the coating may be used to determine an overall health (e.g., overall health index) of the coating of the structure. The propert(ies) of the coating may be used to determine where and when the coating of the structure needs to be repaired. For example, the defects in the coating may be classified based on extent of the damage and/or the need for repair. The timing of maintenance for the structure to repair the coating may be determined based on characteristics of the defects in the coating. For example, a pinhead-sized defect in the coating may be identified for monitoring, while a fingernail-sized defect in the coating may be identified for repair. As another example, a defect in a non-critical area of the structure may be identified for monitoring while a defect in a critical area of the structure may be identified for repair.

In some implementations, one or more outlier detections (e.g., anomaly detections) may be performed on the acoustic response of the coating to determine the propert(ies) of the coating. For example, outlier analysis of the acoustic response of the coating may be used to determine properties of defect(s) in the coating. An outlier in the acoustic response of the coating may refer to a portion of the acoustic response of the coating that is statistically/markedly different from other portions of the acoustic response of the coating. In some implementations, an extent to which a portion of the acoustic response of the coating must deviate from other portions of the acoustic response for the portion to be considered statistically/markedly different from other portions may be determined based on use of one or more thresholds, criteria, and/or other factors. In some implementations, an extent to which a portion of the acoustic response of the coating must deviate from other portions of the acoustic response for the portion to be considered statistically/markedly different from other portions may be set by a user of the system 10.

An outlier in the acoustic response of the coating may indicate the presence of a defect in the coating. The amount and/or type of outlier in the acoustic response of the coating may be used to identify/determine properties of the defect. For example, outlier detection may be used on the response of the coating to identify regions of the coating with higher relative strain energy, as described below, which may be in turn used to identify/determine properties of defects in the coating. Use of other outlier detection is contemplated.

In some implementations, determination of the propert(ies) of the coating, based on the acoustic response of the coating (e.g., acoustic spatial wavefield response of the coating) in the filtered measurement of acoustic excitation in the structure, may include: (1) generation of one or more defect maps of the coating based on the acoustic response of the coating in the filtered measurement of acoustic excitation in the structure and/or other information; and (2) determination of the propert(ies) of the coating based on the defect map(s) and/or other information.

A defect map may refer to an image that visually represents defects in a coating. A defect map may refer to an image that visually represents different characteristics of the coating. For example, a defect map may visually represent different acoustic responses in the coating using different values of pixels (e.g., different colors, different intensities). A defect map may visually represent outliers in the acoustic responses in the coating using different values of pixels. Use of other statistics of the acoustic responses in the coating and other types of defect maps are contemplated.

In some implementations, separate defect maps may be generated using separate excitation frequencies. The extent of excitation in the defects may depend on the excitation frequency and the size and/or the type of the defect. Separate defect map from separate excitation frequencies may be combined to provide a combined defect map. The combined defect map may provide a more comprehensive view of defects in the coating than individual defect maps.

In some implementations, the defect map(s) may be presented within one or more graphical user interfaces. In some implementations, the defect map(s) may be presented on one or more display. In some implementations, the defect map(s) may be overlaid on top of or registered to (e.g., references) the structure. For example, a defect map may be presented on top of an image of the structure (e.g., using an overlay, combined with the image of the structure) and/or projected on top of the actual structure. The defect map and the structure (structure in the image, actual structure) may be aligned so that the defects in the defect map are presented on top of the defects in the coating of the structure.

In some implementations, multiple defects maps of the coating may be generated based on the acoustic response of the coating at different times. The acoustic excitation in the structure may be measured over time, and the acoustic response of the coating at different times may be used to generate separate defect maps of the coating. The defect maps for different times may show change in or progression of defects in the coating over time. For example, the defect maps for different times may show appearance of and/or change in size/shape of defects in the coating overtime. Change in or progression of defects in the coating may be determined by comparing the defect maps for different times. Change in or progression of defects in the coating may be determined based on the multiple defect maps overlaid on top of or registered to the structure. The defect maps for different times may be used to determine how the coating ages with time.

In some implementations, generation of the defect map(s) of the coating based on the acoustic response of the coating in the filtered measurement of acoustic excitation in the structure may include determination pixel values of the defect map(s) based on outlier analysis of the acoustic response of the coating and/or other information. For example, the outlier analysis of the acoustic response of the coating may include calculation of changes in the displacement response, the velocity response, and/or the acceleration response in the structure/coating, and the change in the displacement response, the velocity response, and/or the acceleration response may be used to determine the pixel values of the defect map(s). Outlier analysis of the acoustic response of the coating may utilize other characteristics of the acoustic response (e.g., other temporal derivatives).

For example, relative velocity feature in the structure/coating may be used to identify changes in strain energy (U), with changes in strain energy indicating presence/propert(ies) of defect in the coating. The rate of change in strain energy may be proportional to the difference in relative velocity ($\overline{V}$) squared over the distance (d) between two points of interest squared. In the calculations, the square may be omitted, and the result may be normalized by the maximum absolute value:

$$\dot{U} \propto \frac{\overline{V}^2}{d^2} = \frac{|V_2 - V_1|^2}{|d_2 - d_1|^2}$$

The relative velocity feature may be calculated within a sub-matrix (grouping of pixels), with the center pixel $\hat{V}(x_c, y_c)$ being the reference pixel, and the surrounding pixels being the calculation pixels $\overline{V}(x_p, y_q)$. In some implementations, the size of the sub-matrix/grouping of pixels may be tuned to the expected size of defect. For example, the size of the sub-matrix/grouping of pixels may be tuned to be larger than the expected size of defect.

The value of the center pixel $\hat{V}(x_c, y_c)$ may be compared to values of other pixels in the grouping (pixels surrounding the center pixel) to determine how the values of the pixels change as you move away from the center pixel. The relative velocity values within the sub-matrix may be summed, and the resulting value may be assigned to the center pixel index, where $rV(x_c, y_c)$ is the relative velocity calculation for all pixels within the sub-matrix $\hat{V}(x_p, y_q)$, and stored at the center indices of the sub-matrix $(x_c, y_c)$. The relative velocity calculation may be performed for different pixels in the defect map.

$$rV(x_c, y_c) = \frac{1}{p*q} \sum_{i=1}^{p} \sum_{j=1}^{q} \frac{\hat{V}(x_c, y_c) - \hat{V}(x_i, y_j)}{\sqrt{(x_c - x_i)^2 + (y_c - y_j)^2}}$$

The relative velocity feature may be used to quantify/identify boundaries of defects in the coating. Assuming that normalized relative velocity (change in relative velocity between two points) is proportional to change in strain energy, and with strain energy changing where there is discontinuity in acoustic wave propagating across the coating, such as due to defect in the coating, a large change in the relative velocity feature between pixels may indicate/quantify defect in the coating. Large, normalized differences between adjacent pixels may indicate/quantify defect in the coating.

The values of the pixels may be computed using a complex relative velocity sub-matrix $\hat{V}(x_p, y_q)$ and the corresponding distance sub-matrix $d(x_p, y_q)$. The reference pixel may be the center of the complex relative velocity sub-matrix at $(x_c, y_c)$. The computation may be performed separately on real and imaginary components of the complex relative velocity data.

The relative velocity feature may be used to quantify/identify a center pixel that deviates from the surrounding pixels. Use of this techniques enables defects of small size (e.g., a defect covered by one or few pixels of the defect map) to be identified, while traditional processing methods may wash out such small details from analysis. The calculation sub-matrix width may be set to the distance between small defects (e.g., bubbling or blistering of coating). The relative velocity feature may highlight pixels that greatly different from others within the calculation sub-matrix.

The relative velocity values may be used as pixel values of a defect map. The relative velocity values may be used to determine pixel values of a defect map. In some implementations, one or more filters may be applied to the defect map to highlight regions with large number of high relative velocity pixels. For example, an order-statistic filter, a disk-shaped filter, and/or other filters may be applied. The width of the order-statistic filter may be fixed (e.g., 4 mm). The width of the order-statistic filter may be set to contain clusters of defects to highlight regions with a high concentration of small defects. The order-statistic filer may sort the values within the calculation matrix in ascending order. The pixels within the calculation matrix may be assigned as the value in a reference index. For example, the reference index may be selected as the $99.6^{th}$ percentile of the positions.

The disk-shaped filter may be used to reshape the results of the order-statistic filter. The shape of the order-statistic filter may be a square, which may result in the filtered data appearing as overlapping squares. The disk-shaped filter may blend the squares together to create a continuous defect map. The disk shape may be used since many coating defects are circular in shape. User of other shapes is contemplated.

The width of disk-shaped filter may be fixed (e.g., 3 mm radius), with a diameter extending beyond the edges of the square-shaped order-statistics filter. The disk-shaped filter may create and apply a 2D pre-defined filter to a matrix by generating a correlation kernel. The output of the disk-shaped filter may be used as the defect map.

Figure 5:
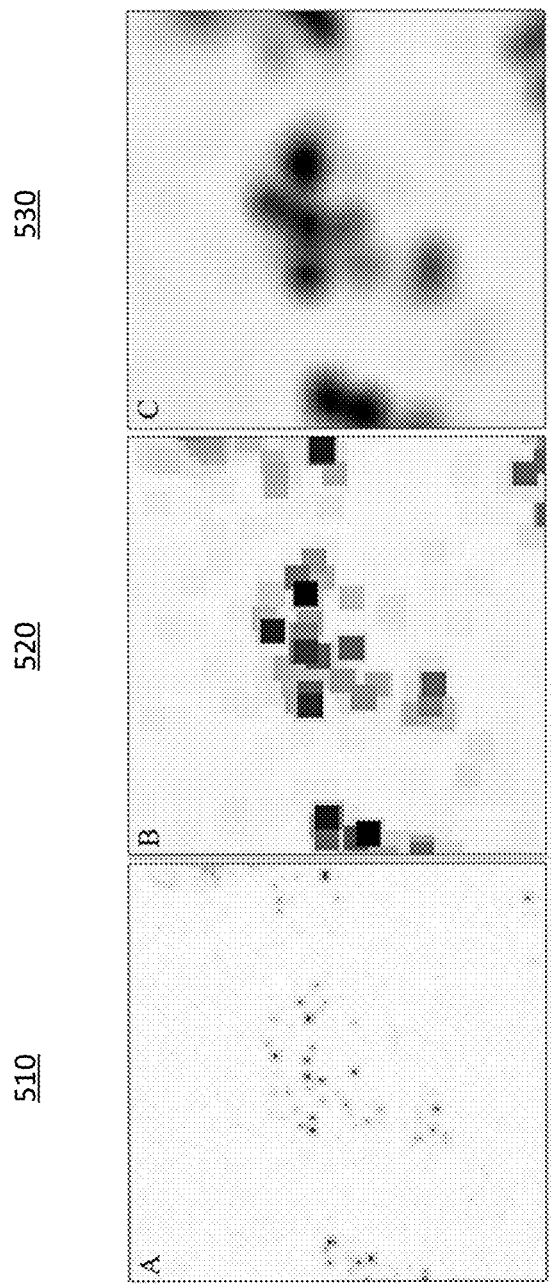
FIG. 5 illustrates an example generation of a defect map.

FIG. 5 illustrates an example generation of a defect map. On the left is an image A 510 that shows values of relative velocity feature for a region of a coating. In the middle is an image B 520 that shows the result of processing the image A 510 through an order-statistic filter. On the right is an image C 530 that shows the result of processing the image B 520 through a disk-shaped filter. The image C 530 may be used as a defect map for the coating. The shapes shown in the image C 530 may correspond to shapes of defects in the coating. The pixel values of the defects in the image C 530 may correspond to different types/severity of defects in the coating.

Figure 6:
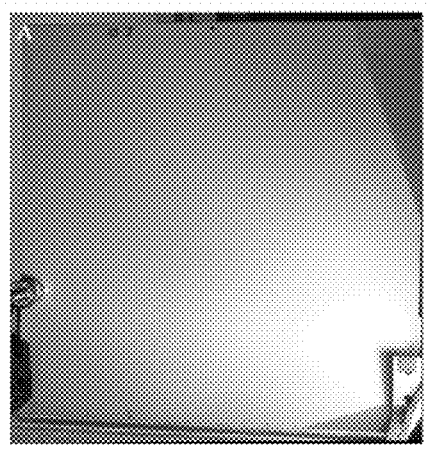
FIG. 6 illustrates an example image of a structure and an example defect map for the structure.
Figure 6:
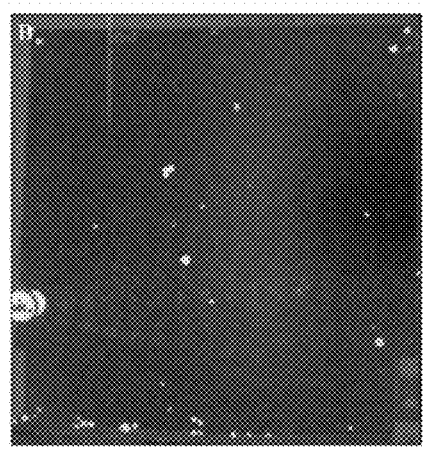
Figure 7:
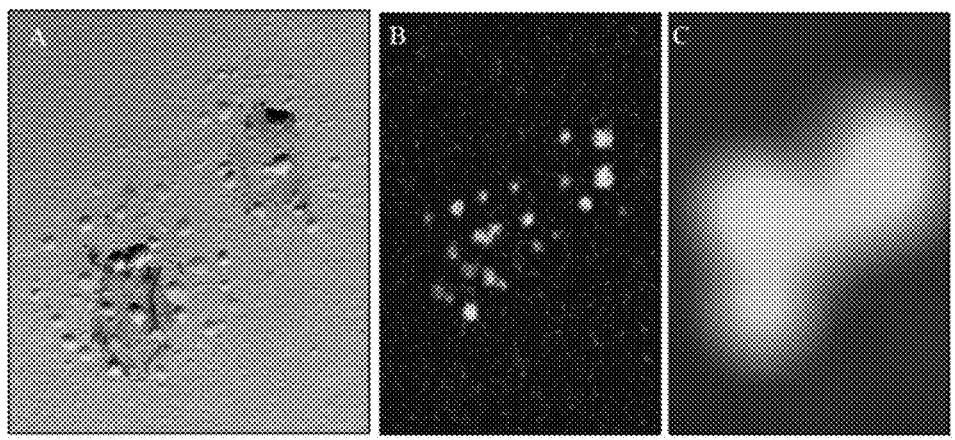
FIG. 7 illustrates an example image of a structure, an example relative velocity feature for the structure, and an example defect map for the structure.
Figure 8:
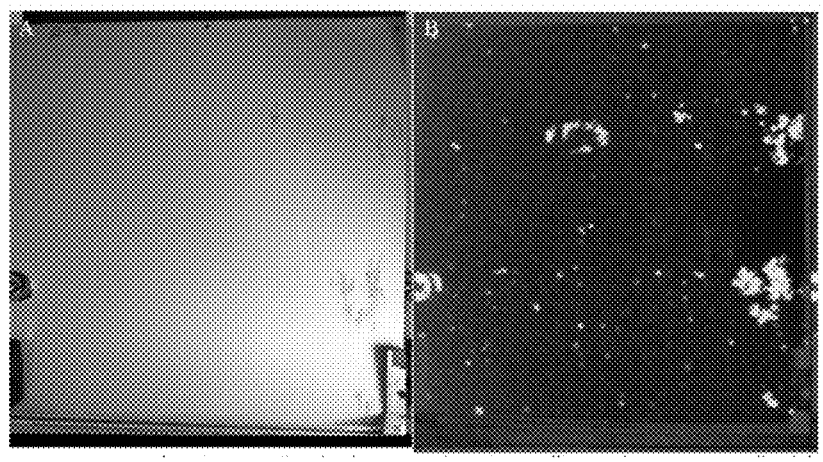
FIG. 8 illustrates an example image of a structure and an example defect map for the structure.

As shown in FIGS. 6-8, the present disclosure enables identification of both visible and non-visible defects in the coating of the structure. FIG. 6 illustrates an example image 610 of a structure and an example defect map 620 for the structure. The image 610 of the structure does not show any visible defects in the coating of the structure. The defect map 620 shows small defects scattered through the coating.

FIG. 7 illustrates an example image 710 of a structure, an example relative velocity feature 720 for the structure, and an example defect map 730 for the structure. The image of the structure 710 shows visible blistering in the coating of the structure. The relative velocity feature 720 for the structure provides a fine-resolution view of the defects in the coating. The relative velocity feature 720 for the structure shows individual blisters in the coating of the structure. The defect map 730 for the structure highlights areas of the coating that include defects.

FIG. 8 illustrates an example image 810 structure and an example defect map 820 for the structure. The image of the structure 810 shows visible defects in the coating of the structure. The defect map 820 for the structure shows both visible defects and non-visible defects in the coating of the structure.

Implementations of the disclosure may be made in hardware, firmware, software, or any suitable combination thereof. Aspects of the disclosure illustrated in FIG. 1 may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 in FIG. 1 may be provided by external resources not included in the system 10. External resources may include hosts/sources of information, computing, and/or processing and/or other providers of information, computing, and/or processing outside of the system 10.

Although the processor 11, the electronic storage 13, the acoustic excitation device 14, and the acoustic measurement device 15 are shown to be connected to the interface 12 in FIG. 1, any communication medium may be used to facilitate direct and/or indirect interaction between any components of the system 10. One or more components of the system 10 may communicate with each other through hardwired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, in implementations in which processor 11 comprises multiple processing units, one or more of computer program components may be located remotely from the other computer program components.

While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
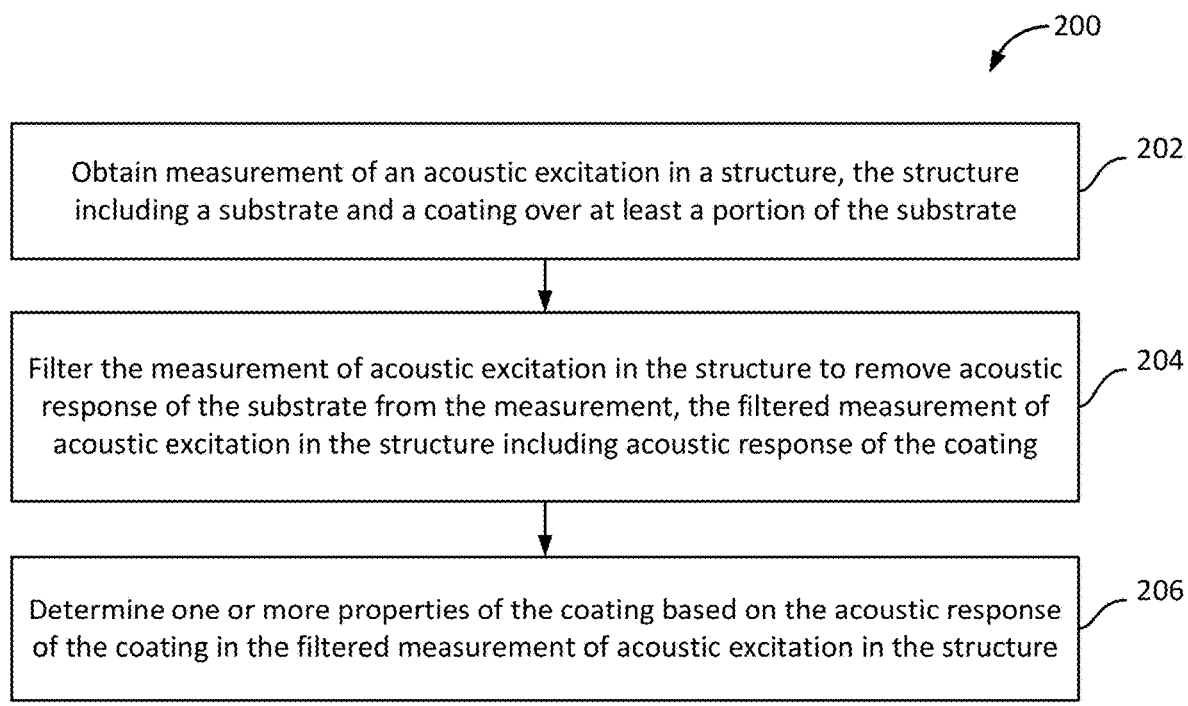
FIG. 2 illustrates an example method for coating inspection.

FIG. 2 illustrates method 200 for coating inspection. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, one or more operations of the method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, measurement of acoustic excitation in a structure is obtained. The structure includes a substrate and a coating over at least a portion of the substrate. In some implementations, operation 202 may be performed by a component the same as, or similar to, the measurement component 102 (Shown in FIG. 1 and described herein).

At operation 204, the measurement of acoustic excitation in the structure is filtered to remove acoustic response of the substrate from the measurement. The filtered measurement of acoustic excitation in the structure includes acoustic response of the coating. In some implementations, operation 204 may be performed by a component the same as, or similar to, the filter component 104 (Shown in FIG. 1 and described herein).

At operation 206, one or more properties of the coating are determined based on the acoustic response of the coating in the filtered measurement of acoustic excitation in the structure and/or other information. In some implementations, operation 206 may be performed by a component the same as, or similar to, the property component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method for coating inspection, the method comprising:
    obtaining measurement of acoustic excitation in a structure, the structure being a hollow structure to hold, carry, or transport a first thing or a support structure that provides support for a second thing, the structure including a substrate and a coating over at least a portion of the substrate;
    filtering the measurement of acoustic excitation in the structure based on identification and removal of dominant modes from the measurement of acoustic excitation in the structure to remove acoustic response of the substrate from the measurement, the filtered measurement of acoustic excitation in the structure including acoustic response of the coating; and
    determining one or more defect properties of the coating based on the acoustic response of the coating in the filtered measurement of acoustic excitation in the structure;
    wherein one or more maintenance activities for the structure is performed based on the one or more defect properties of the coating.

2. The method of claim 1, wherein filtering the measurement of acoustic excitation in the structure to remove acoustic response of the substrate from the measurement includes applying one or more spatial band-stop filters.

3. The method of claim 1, wherein the one or more defect properties of the coating include location, size, and/or type of a defect in the coating.

4. The method of claim 3, wherein the defect in the coating includes reduced adhesion between the coating and the substrate.

5. The method of claim 1, wherein determining the one or more defect properties of the coating based on the acoustic response of the coating in the filtered measurement of acoustic excitation in the structure includes:
    generating a defect map of the coating based on the acoustic response of the coating in the filtered measurement of acoustic excitation in the structure; and
    determining the one or more defect properties of the coating based on the defect map.

6. The method of claim 5, wherein the defect map is overlaid on top of or registered to the structure.

7. The method of claim 6, wherein multiple defects maps of the coating are generated based on the acoustic response of the coating at different times, and change in or progression of defects in the coating are determined based on the multiple defect maps overlaid on top of or registered to the structure.

8. The method of claim 5 wherein;
    generating the defect map of the coating based on the acoustic response of the coating in the filtered measurement of acoustic excitation in the structure includes determining pixel values of the defect map based on relative values of the acoustic response of the coating;
    a given pixel value of the defect map corresponds to a given location on the structure, the given location surrounded by surrounding locations on the structure; and
    the given pixel value of the defect map is determined based on combination of differences between a value of the acoustic response of the coating at the given location and values of the acoustic response of the coating at the surrounding locations.

9. The method of claim 8, wherein the value of the acoustic response of the coating includes a value of displacement response, velocity response, or acceleration response.

10. The method of claim 8 wherein shapes of defects within the defect map are changed based on application of filters to the defect map, the application of filters to the defect map including:
    application of an order statistics filter to modify the shapes of the defects into square shapes; and
    application of a disk-shaped filter to reshape the square shapes of the defects into circular shapes.

11. The method of claim 1, wherein the one or more defect properties of the coating are determined non-destructively and a distance away from the structure.

12. The method of claim 11, wherein the one or more defect properties of the coating are determined in a line-of-sight inspection of the structure.

13. The method of claim 1, wherein:
    the hollow structure is a vehicle, a container, a pipe, a pressure vessel, or a tank; and
    the support structure is an installation, a platform, a frame, a crane, or a beam.

14. A system for coating inspection, the system comprising:
    one or more physical processors configured by machine-readable instructions to:

obtain measurement of acoustic excitation in a structure, the structure being a hollow structure or a support structure, the structure including a substrate and a coating over at least a portion of the substrate;

filter the measurement of acoustic excitation in the structure based on identification and removal of dominant modes from the measurement of acoustic excitation in the structure to remove acoustic response of the substrate from the measurement, the filtered measurement of acoustic excitation in the structure including acoustic response of the coating; and determine one or more defect properties of the coating based on the acoustic response of the coating in the filtered measurement of acoustic excitation in the structure;

wherein one or more maintenance activities for the structure is performed based on the one or more defect properties of the coating.

15. The system of claim 14, wherein filtering of the measurement of acoustic excitation in the structure to remove acoustic response of the substrate from the measurement includes application of one or more spatial band-stop filters.

16. The system of claim 14, wherein the one or more defect properties of the coating include location, size, and/or type of a defect in the coating.

17. The system of claim 14, wherein determination of the one or more defect properties of the coating based on the acoustic response of the coating in the filtered measurement of acoustic excitation in the structure includes:

generation of a defect map of the coating based on the acoustic response of the coating in the filtered measurement of acoustic excitation in the structure; and determination of the one or more defect properties of the coating based on the defect map.

18. The system of claim 17, wherein:

generation of the defect map of the coating based on the acoustic response of the coating in the filtered measurement of acoustic excitation in the structure includes determination of pixel values of the defect map based on relative values of the acoustic response of the coating;

a given pixel value of the defect map corresponds to a given location on the structure, the given location surrounded by surrounding locations on the structure; and the given pixel value of the defect map is determined based on combination of differences between a value of the acoustic response of the coating at the given location and values of the acoustic response of the coating at the surrounding locations.

19. The system of claim 18, wherein the value of the acoustic response of the coating includes a value of displacement response, velocity response, or acceleration response.

20. The system of claim 18, wherein shapes of defects within the defect map are changed based on application of filters to the defect map, the application of filters to the defect map including:

application of an order statistics filter to modify the shapes of the defects into square shapes; and application of a disk-shaped filter to reshape the square shapes of the defects into circular shapes.

* * * * *